Figure 1:
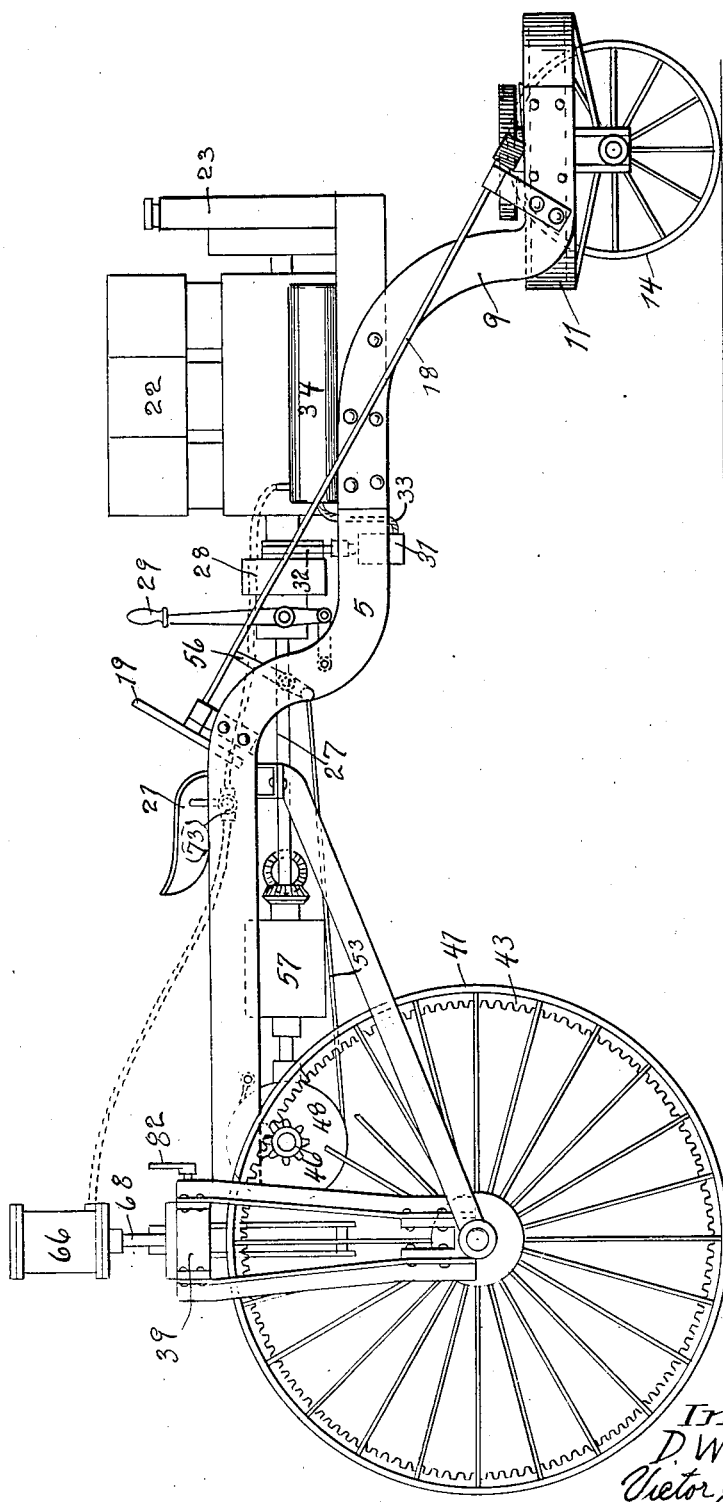

Oct. 14, 1924.

D. W. GLASCOCK

LOGGING TRACTOR

Filed May 2, 1923

1,511,959

3 Sheets-Sheet 1

Inventor
D. W. GLASCOCK
By Victor J. Evans
Attorney

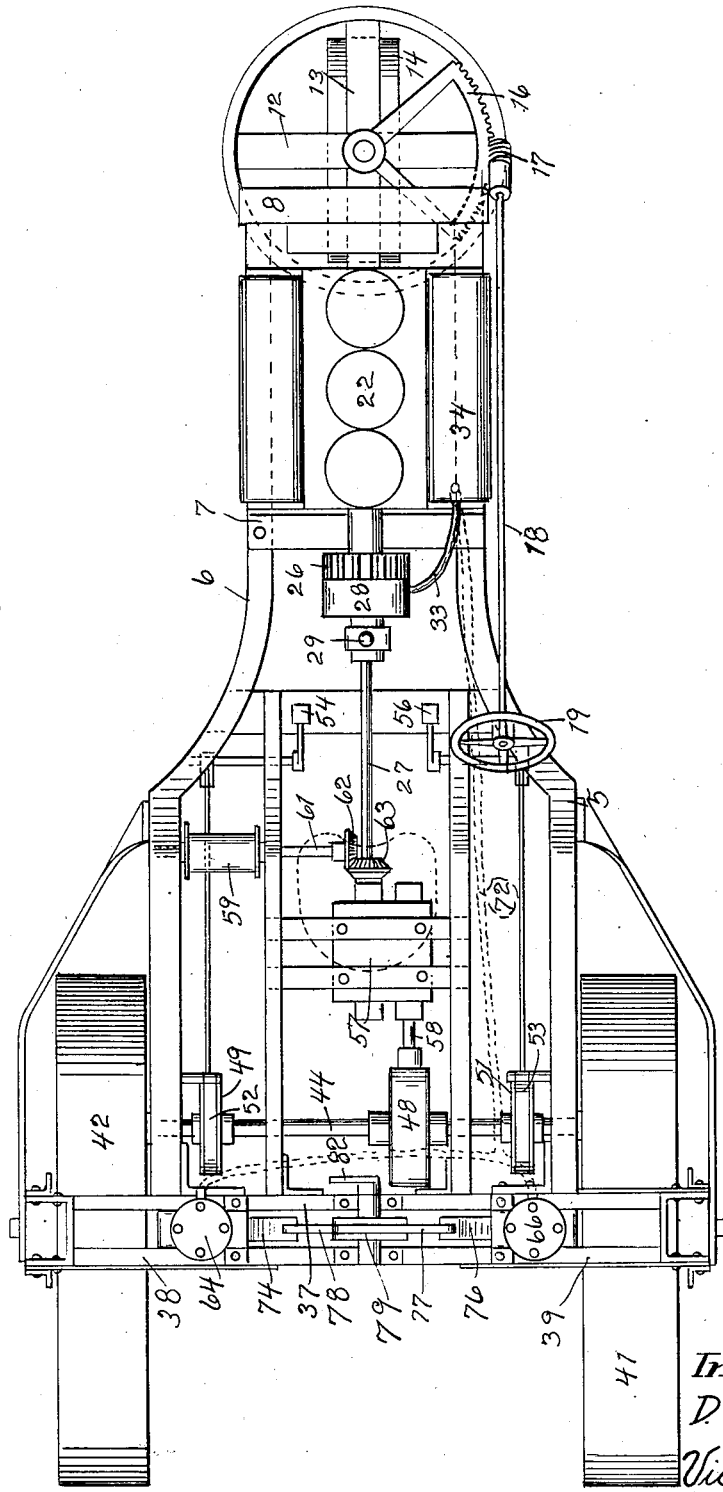

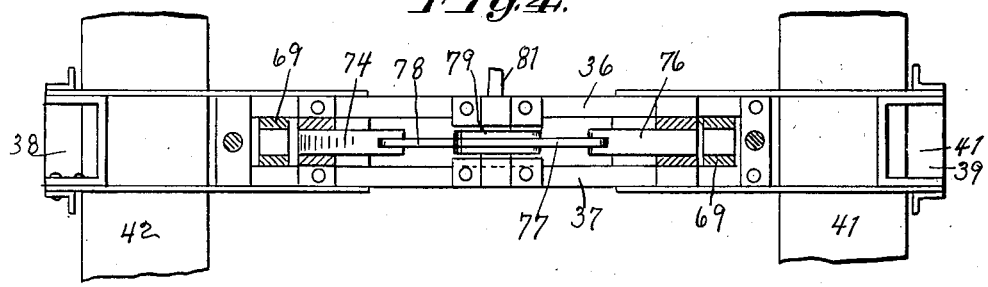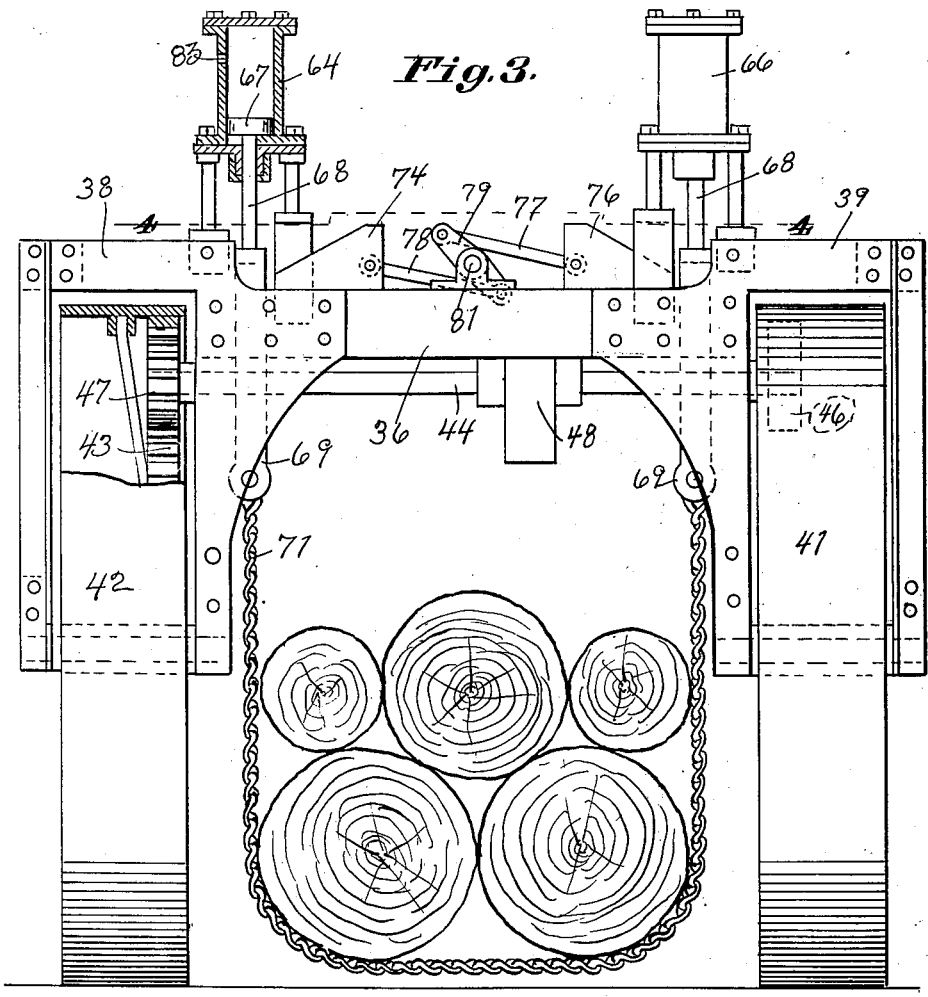

Patented Oct. 14, 1924.

1,511,959

UNITED STATES PATENT OFFICE.

DANIEL W. GLASCOCK, OF STOCKTON, CALIFORNIA.

LOGGING TRACTOR.

Application filed May 2, 1923. Serial No. 636,269.

*To all whom it may concern:*

Be it known that I, DANIEL W. GLASCOCK, a citizen of the United States, residing at Stockton, in the county of San Joaquin and State of California, have invented new and useful Improvements in Logging Tractors, of which the following is a specification.

This invention relates to improvements in logging tractors and has particular reference to that type of logging device which is capable of lifting one or more logs and transporting the same while suspended beneath the vehicle.

The principal object of this invention is to provide simple and efficient means for lifting and maintaining the logs in an elevated position.

Another object is to provide a vehicle capable of transporting itself from point to point, together with the suspended load and one which is cheap to manufacture, simple in construction and well within the purchase price of the average user.

A still further object is to provide means whereby a brake may be applied to either of the rear wheels in such a manner as to assist in the turning movement through the locking of one of the wheels.

A still further object is to provide means to prevent accidental dropping of the load after the same has been raised and while being transported.

Other objects and advantages will be apparent during the course of the following description.

In the accompanying drawings forming a part of this specification, and in which like numerals are employed to designate like parts throughout the same, Figure 1 is a side elevation of my invention, Figure 2 is a top plan view of Figure 1, Figure 3 is a rear elevation of Figure 1, and Figure 4 is a cross section taken on the line 4—4 of Figure 3.

In the accompanying drawings wherein for the purpose of illustration is shown a preferred embodiment of my invention, the numerals 5 and 6 refer to the side frame members forming the vehicle chassis, which side members are connected by cross members 7 and 8 and carry at their forward extremities downwardly extending braces 9. These braces 9 serve to position a ring 11 having cross braces 12 and 13, within which is centrally pivoted a pilot wheel 14, which pilot wheel is spring mounted and adapted to be steered by a quadrant 16 meshing with a worm 17 which is rotated through the usual steering rod 18 and steering wheel 19, it being understood that this steering wheel 19, is positioned adjacent the driver's seat 21.

An internal combustion engine 22 is mounted upon the forward portion of the chassis and it will be noted by viewing Figure 1 that this part of the chassis is dropped to accommodate the mounting of the engine.

The usual clutch 28 is interposed between the engine 22 and the shaft 27 and is operated through the medium of a clutch lever 29.

At 31 I have shown a compression cylinder operated by an eccentric 32. This compresser is adapted to furnish air through a pipe 33 to a compressed air storage tank 34.

By now referring to Figures 2 and 3, it will be noted that cross pieces 36 and 37 parallel spaced are connected to the frame members 5 and 6 and to yoke members 38 and 39. It will be noted that these yoke members are fabricated and as their construction is well shown, in these figures, further comment will be unnecessary.

These yokes serve to position driving wheels 41 and 42 of large diameter. These driving wheels are provided with an internal gear as shown at 43 and are adapted to be driven by a driving shaft 44 having a spur gear 46 and 47 mounted upon its opposite ends.

The usual differential is mounted in a casing 48, and functions in a manner well known in this art. Mounted upon the opposite extremities of the shaft 44 are brake drums 49 and 51 about which are placed brake bands 52 and 53 respectively. These brake bands are each carried forward and connected to a brake pedal as shown at 54 and 56, thus allowing the operator to apply either brake independently of the other.

In order to transmit power from the shaft 27 to the differential 48 I provide a gear casing 57 within which is mounted the usual shifting gear mechanism. It is of course understood that the shaft 27 is connected to one of the gears within the gear casing and that a similar shaft 58 serves to transmit power from the gears in the gear casing to the differential mounted in the differential casing 48.

At 59 I have shown a drum mounted upon a shaft 61 and provided with a bevel gear 62 adapted to mesh with a bevel gear 63 mounted upon the shaft 27. The object of this drum and drive is to provide for taking off power when the vehicle is standing idle.

By now referring to Figures 1, 2 and 3, it will be noted that I have provided cylinders 64 and 66 which are suitably supported above the cross pieces 36 and 37. These cylinders are each provided with a piston as best shown at 67 which piston is connected to a piston rod 68 which in turn is connected to a U-shaped link 69. This link in turn is connected to one end of a chain 71, the opposite end being connected to a similar link suspended from the opposite piston. Compressed air is conducted from the storage tank 34 through a pipe shown in dotted lines at 72 to each of the cylinders at a point beneath the pistons.

A three-way valve 73 is provided adjacent the operator's seat so that the flow of air from the tank to the cylinder and the exhaust of the same may be easily controlled.

At 74 and 76 I have shown wedges slidably mounted between the cross pieces 36 and 37 and connected by links 77 and 78 to a walking beam 79 which is pivoted upon a shaft 81.

A handle 82 serves to operate the walking beam for the purpose of moving the wedges to and from each other and into a position beneath the upper ends of the U-shaped links 69.

The operation of my device is as follows:—

Assuming that the device has been assembled as shown in Figures 1 and 2 and that it is desired to raise a pile of logs, the device is moved over the logs, a chain passed therebeneath and secured to the lower ends of the links 69.

The valve 73 is then turned, it being presumed that compressed air has already been stored in the tank 34, which results in raising the pistons 67 and therefore the logs suspended in the chain 71. After these logs have been raised, the handle 82 is rotated so as to rotate the walking beam 79 thus causing the wedges 74 and 76 to move to a position beneath the upper end of the links 69. This prevents the links from dropping should the air beneath the cylinder 67 escape.

By referring to Figure 3, it will be noted that I have provided a port 83 which is for the escape of air confined about the piston 67, and further to provide a confined air space in the upper end of the cylinder to prevent the piston striking the cylinder head in the event that the chain 71 breaks. The driving of the tractor is accomplished in the usual manner.

It is to be understood that the form of my invention herewith shown and described is to be taken as a preferred example of the same, and that various changes in the shape, size and arrangement of parts may be resorted to without departing from the spirit of the invention or the scope of the subjoined claim.

Having thus described my invention I claim:—

In a device of the character described, a chassis, parallel cross pieces secured to each end of said chassis, a yoke secured to said cross pieces and at a point outside of the outer margin of said chassis, wheels mounted in said yokes, a steering wheel pivotally mounted at the opposite end of said chassis, cylinders mounted on said cross pieces, pistons slidable in said cylinders, connecting rods connected to said pistons and extending downwardly therefrom, a U-shaped link secured to each of said piston rods, the lower extremities of said U-shaped links being connected by a chain, means for controlling the admission of compressed air to said cylinders at a point beneath said pistons, oppositely disposed wedges slidably mounted on said chassis, a walking beam, links connected to said walking beam and to said wedges in such a manner as to impart simultaneous movement to said wedges when said walking beam is moved, means for moving said walking beam so as to move said wedges into said U-shaped links and to a point beneath said connecting rods for the purpose of maintaining said U-shaped links in a raised position for the purpose specified.

In testimony whereof I affix my signature.

DANIEL W. GLASCOCK.